United States Patent
Satoh

(10) Patent No.: US 8,078,892 B2
(45) Date of Patent: Dec. 13, 2011

(54) INFORMATION-PROCESSING APPARATUS, PACKET PROCESSING METHOD, AND COMPUTER PROGRAM PRODUCT FOR COMMUNICATING WITH AN EXTERNAL NETWORK DEVICE AND SWITCHING BETWEEN A NORMAL POWER MODE AND A POWER SAVING MODE

(75) Inventor: Shohichi Satoh, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 459 days.

(21) Appl. No.: 12/254,396

(22) Filed: Oct. 20, 2008

(65) Prior Publication Data

US 2009/0119522 A1    May 7, 2009

(30) Foreign Application Priority Data

Nov. 1, 2007  (JP) ................. 2007-285319
Sep. 16, 2008  (JP) ................. 2008-236877

(51) Int. Cl.
  *G06F 1/32* (2006.01)
(52) U.S. Cl. .................. 713/320; 713/324
(58) Field of Classification Search .......... 713/300, 713/320, 323–324, 340
  See application file for complete search history.

(56) References Cited

U.S. PATENT DOCUMENTS

| | | | | |
|---|---|---|---|---|
| 5,742,833 A * | 4/1998 | Dea et al. | ...................... | 713/323 |
| 6,622,251 B1 * | 9/2003 | Lindskog et al. | ............. | 713/300 |
| 6,848,059 B2 * | 1/2005 | Bullman et al. | ............... | 713/323 |
| 7,562,239 B2 * | 7/2009 | Fung | .............................. | 713/320 |
| 7,779,282 B2 * | 8/2010 | Ramachandran et al. | .... | 713/323 |
| 7,805,621 B2 * | 9/2010 | Kendall et al. | ................. | 713/300 |
| 2002/0194512 A1 * | 12/2002 | Weng et al. | ..................... | 713/300 |
| 2004/0268111 A1 * | 12/2004 | Dayan et al. | ...................... | 713/2 |
| 2005/0223248 A1 * | 10/2005 | Lim et al. | ...................... | 713/300 |
| 2008/0130033 A1 | 6/2008 | Satoh | | |

FOREIGN PATENT DOCUMENTS

| | | |
|---|---|---|
| JP | 2004-362282 | 12/2004 |
| JP | 2007-148681 | 6/2007 |

OTHER PUBLICATIONS

U.S. Appl. No. 12/268,635, filed Nov. 11, 2008, Satoh.

* cited by examiner

*Primary Examiner* — Raymond Phan
(74) *Attorney, Agent, or Firm* — Oblon, Spivak, McClelland, Maier & Neustadt, L.L.P.

(57) ABSTRACT

A processor includes a communication control unit for communicating with an external network device via a connecting unit. A power control unit switches a power mode between a normal power mode and a power saving mode. A packet processing unit includes a first determining unit that determines whether a packet processing is needed for a packet received when the power saving mode is set and a second determining unit that determines, when it is determined that the packet processing is needed, whether the packet processing is available. The power control unit switches the power mode based on a result of determination by the second determining unit.

12 Claims, 12 Drawing Sheets

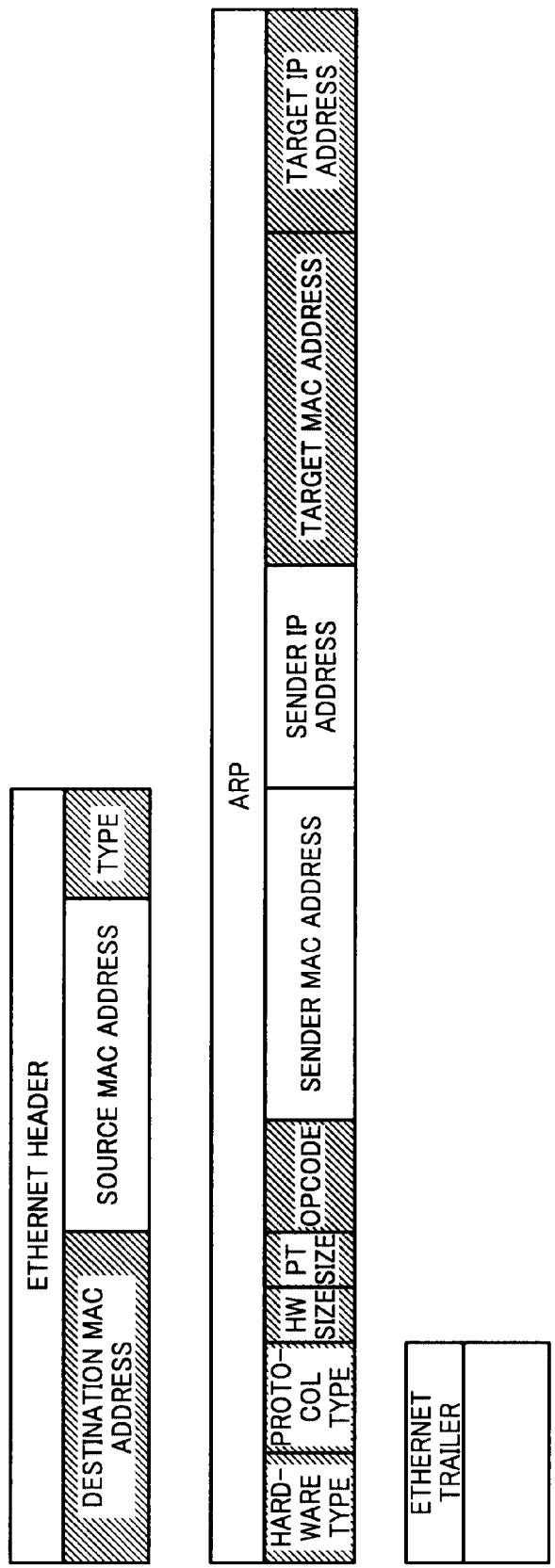

FIG. 6

| FIELD | CONDITION |
|---|---|
| ETHERNET HEADER: DESTINATION MAC ADDRESS | BROADCAST ADDRESS OR MAC ADDRESS OF ITS OWN STATION |
| ETHERNET HEADER: TYPE | ARP (0 × 0806) |
| ARP: HARDWARE TYPE | ETHERNET (0 × 0001) |
| ARP: PROTOCOL TYPE | IP (0 × 0800) |
| ARP: HARDWARE SIZE | 0 × 06 |
| ARP: PROTOCOL SIZE | 0 × 04 |
| ARP: OPCODE | REQUEST (0 × 0001) |
| ARP: TARGET MAC ADDRESS | BROADCAST ADDRESS OR MAC ADDRESS OF ITS OWN STATION |
| ARP: TARGET IP ADDRESS | IP ADDRESS OF ITS OWN STATION |

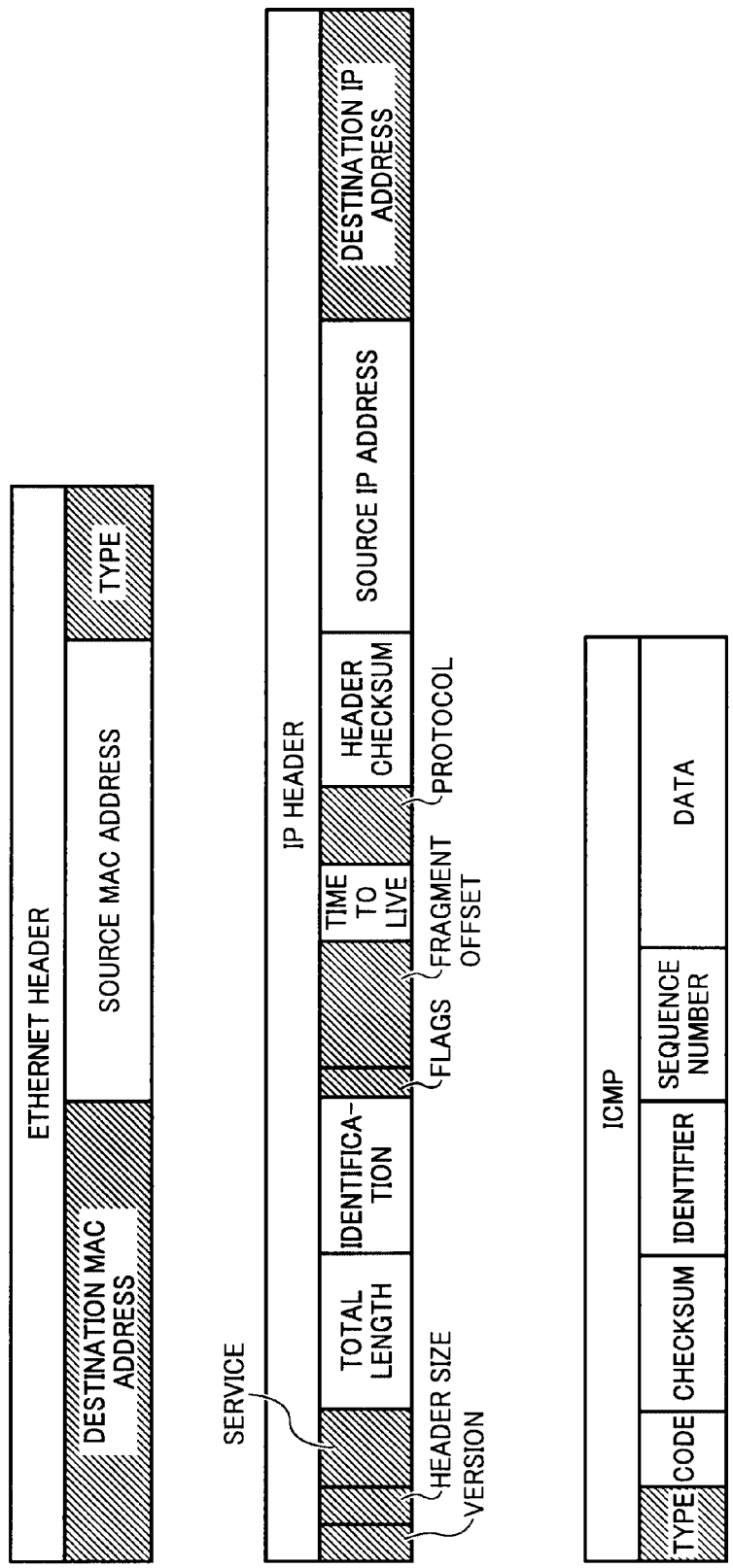

| FIELD | CONDITION |
|---|---|
| ETHERNET HEADER: DESTINATION MAC ADDRESS | MAC ADDRESS OF ITS OWN STATION |
| ETHERNET HEADER: TYPE | IP (0 × 0800) |
| IP HEADER: VERSION | IPv4 (0 × 4) |
| IP HEADER: HEADER LENGTH | 20 BYTES (0 × 5) |
| IP HEADER: FLAGS | 0 × 0 |
| IP HEADER: FLAGMENT OFFSET | 0 × 0000 |
| IP HEADER: PROTOCOL | ICMP (0 × 01) |
| IP HEADER: VERSION | IPv4 (0 × 4) |
| IP HEADER: DESTINATION IP ADDRESS | IP ADDRESS OF ITS OWN STATION |
| ICMP: TYPE | ECHO REQUEST (0 × 08) |

…

INFORMATION-PROCESSING APPARATUS, PACKET PROCESSING METHOD, AND COMPUTER PROGRAM PRODUCT FOR COMMUNICATING WITH AN EXTERNAL NETWORK DEVICE AND SWITCHING BETWEEN A NORMAL POWER MODE AND A POWER SAVING MODE

CROSS-REFERENCE TO RELATED APPLICATIONS

The present application claims priority to and incorporates by reference the entire contents of Japanese priority document 2007-285319 filed in Japan on Nov. 1, 2007 and Japanese priority document 2008-236877 filed in Japan on Sep. 16, 2008.

BACKGROUND OF THE INVENTION

1. Field of the Invention

The present invention relates to a network-connected information-processing apparatus capable of switching power modes, a packet processing method, and a computer program product.

2. Description of the Related Art

Recently, such a network system that a plurality of information-processing apparatuses, such as a computer and a printer, is connected to one another by, for example, an Ethernet (Registered Trademark) local area network (LAN) connection thereby enabling data transmission/reception among the information-processing apparatuses has been in widespread use. The information-processing apparatus typically includes a control processor equipped with a media access controller (MAC) and the like, and has a power-mode switching function. With the power-mode switching function, the information-processing apparatus can switch power modes. When predetermined conditions are met, the information-processing apparatus switches from a normal power mode to a power saving mode, for example, by shutting off a power supply to a part of the apparatus including the processor, thereby reducing power consumption.

However, in the conventional technology, such a typical information-processing apparatus can neither discard a predetermined packet received via the network nor transmit a response packet with respect to the received packet without intervention of a central processing unit (CPU) of the processor. Therefore, even when the information-processing apparatus is put into the power saving mode, for example, by switching the CPU to a sleep mode, the CPU needs to be switched back to a normal power mode every time the information-processing apparatus receives a packet. In other words, the CPU cannot be in a low power-consumption state for a long time. Thus, it is difficult for the conventional information-processing apparatus to reduce the power consumption effectively.

As one technique to cope with this problem, the CPU, the MAC, and a packet processing unit capable of processing a predetermined packet can be integrated into an application specific integrated circuit (ASIC). In this technique, while the information-processing apparatus is in the power saving mode, the packet processing unit can process a portion of a received packet without intervention of the CPU. However, in such an information-processing apparatus employing various types of processors to support various types of performances of the system, there is a disadvantage of a high development cost for the ASIC.

As another technique, a dedicated network controller for processing a received packet and the like can be provided to an external bus of the CPU, such as a peripheral components interconnect (PCI) bus. However, in this technique, it is necessary to provide functions irrelevant to network communications, such as a PCI bus function, to the information-processing apparatus additionally. Therefore, the MAC and a network processing function of the processor including the CPU are not utilized effectively. In addition, a cost of the entire apparatus disadvantageously increases.

It is common knowledge that as an operating frequency of the circuit gets lower, power consumption of the circuit gets smaller. With this knowledge, for example, Japanese Patent Application Laid-open No. 2007-148681 and Japanese Patent Application Laid-open No. 2004-362282 disclose an apparatus that switches power modes of which by changing a clock frequency to be supplied to a network-connected information-processing apparatus or the like thereby reducing power consumption of the apparatus.

However, in the technology disclosed in Japanese Patent Application Laid-open No. 2007-148681, a received packet is to be processed by a CPU. Therefore, in the same manner as described above, the CPU cannot be in a low power-consumption state for a long time. Thus, it is difficult to reduce the power consumption effectively.

Furthermore, in the technology disclosed in Japanese Patent Application Laid-open No. 2004-362282, it is necessary to provide a specific dedicated unit, for example, for controlling a network connection and for controlling a change in clock frequency while the apparatus is in the power saving mode to a circuit. Therefore, a configuration of the circuit becomes complicated, and thus a cost of the apparatus disadvantageously increases.

SUMMARY OF THE INVENTION

It is an object of the present invention to at least partially solve the problems in the conventional technology.

According to one aspect of the present invention, there is provided an information-processing apparatus including a connecting unit for connecting to a network; a processor including a communication control unit for communicating with an external network device via the connecting unit; a power control unit that switches a power mode between a first power mode in which a power is supplied to all elements and a second power mode in which a power supply is limited to selected elements; and a packet processing unit that is connected between the connecting unit and the processor. The packet processing unit includes a first determining unit that determines whether a packet processing is needed for a packet received through the connecting unit when the power mode is set to the second power mode and a second determining unit that determines, when the first determining unit determines that the packet processing is needed for the packet, whether the packet processing is available in the packet processing unit. The power control unit switches the power mode based on a result of determination by the second determining unit.

Furthermore, according to another aspect of the present invention, there is provided a method of processing a packet in an information processing apparatus that includes a connecting unit for connecting to a network, a processor including a communication control unit for communicating with an external network device via the connecting unit, and a packet processing unit that is connected between the connecting unit and the processor. The method includes switching a power mode between a first power mode in which a power is supplied to all elements and a second power mode in which a power supply is limited to selected elements; first determining including determining whether a packet processing is needed for a packet received through the connecting unit when the power mode is set to the second power mode; and second determining including determining, when it is determined that the packet processing is needed for the packet at the first determining, whether the packet processing is available. The switching includes switching the power mode based on a result of determination at the second determining.

Moreover, according to still another aspect of the present invention, there is provided a computer program product including a computer-usable medium having computer-readable program codes embodied in the medium for processing a packet in an information processing apparatus that includes a connecting unit for connecting to a network, a processor including a communication control unit for communicating with an external network device via the connecting unit, and a packet processing unit that is connected between the connecting unit and the processor. The program codes when executed cause a computer to execute switching a power mode between a first power mode in which a power is supplied to all elements and a second power mode in which a power supply is limited to selected elements; first determining including determining whether a packet processing is needed for a packet received through the connecting unit when the power mode is set to the second power mode; and second determining including determining, when it is determined that the packet processing is needed for the packet at the first determining, whether the packet processing is available. The switching includes switching the power mode based on a result of determination at the second determining.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a schematic diagram for explaining a data structure of an ARP request packet;

FIG. 6 is a table for explaining conditions for creating a response packet by each of fields included in the ARP request packet shown in FIG. 5 to be detected by a filter shown in FIG. 2;

FIG. 7 is a schematic diagram for explaining a data structure of a PING request packet;

DETAILED DESCRIPTION OF THE PREFERRED EMBODIMENTS

Exemplary embodiments of the present invention are explained in detail below with reference to the accompanying drawings.

An information-processing apparatus according to the present embodiments is connected to a network such as an Ethernet LAN or other LAN, and communicates with an external network device via the network. The information-processing apparatus has a power-mode switching function capable of switching between a normal power mode and a power saving mode. For example, when predetermined conditions are met, the information-processing apparatus can switch from the normal power mode to the power saving mode so as to reduce power consumption. As an example of the information-processing apparatus, a network-connected printer is explained below.

Figure 1:
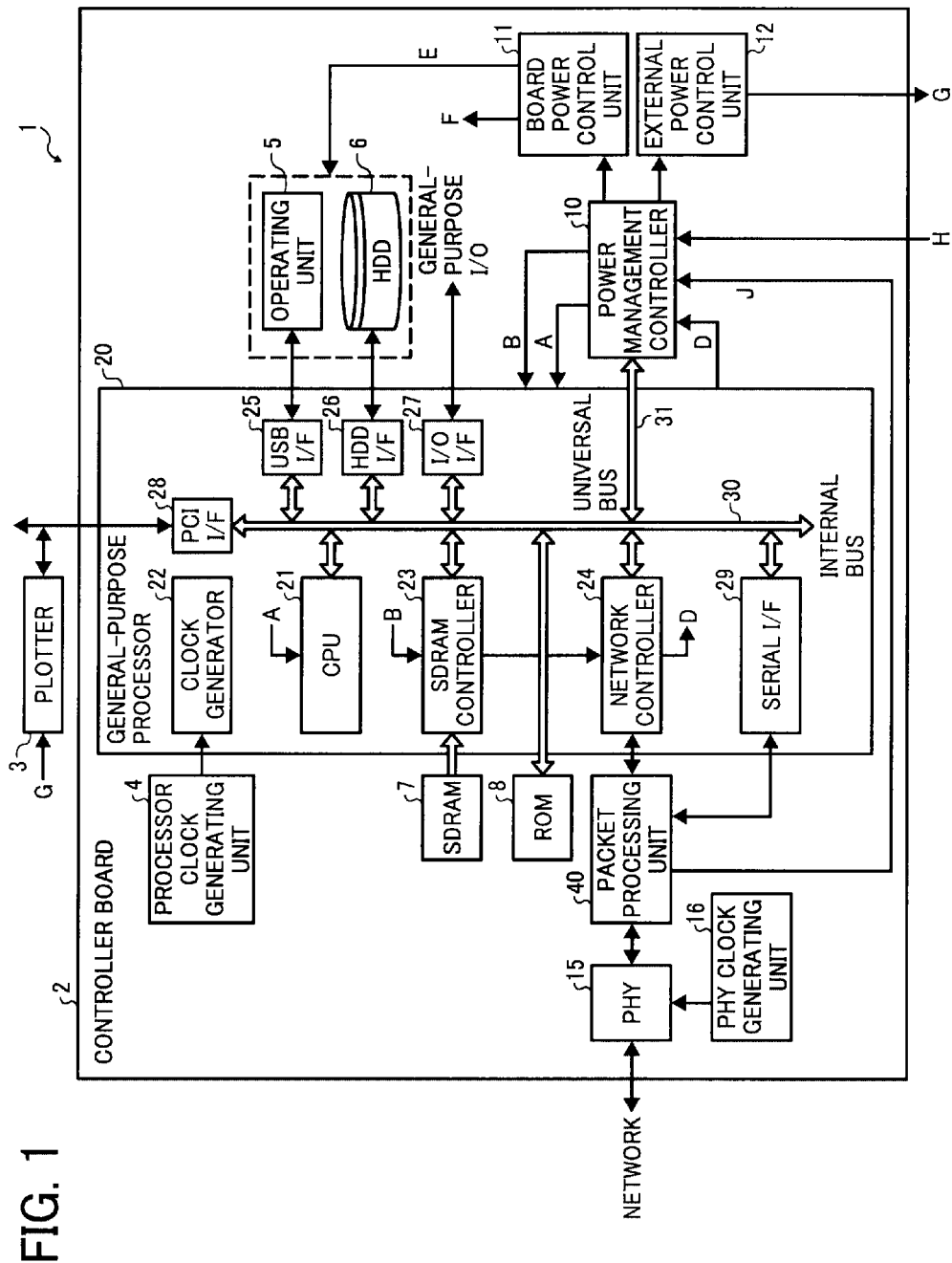
FIG. 1 is a block diagram of a printer according to a first embodiment of the present invention.

FIG. 1 is a block diagram of a printer 1 according to a first embodiment of the present invention. The printer 1 includes a controller board 2 and a plotter 3. The controller board 2 is a control unit for controlling the printer 1. The plotter 3 is a printing unit for performing a print job. Upon receiving a print request from an external network device, the plotter 3 performs a print job under the control of the controller board 2.

The controller board 2 includes a general-purpose processor 20, a processor clock generating unit 4, an operating unit 5, a hard disk drive (HDD) 6, a synchronous dynamic random access memory (SDRAM) 7, and a read-only memory (ROM) 8. The processor clock generating unit 4 generates a clock and supplies the generated clock to the general-purpose processor 20. The operating unit 5 is used when a user operates the printer 1. The HDD 6 stores therein data. The SDRAM 7 serves as a working memory. The ROM 8 is a memory for storing therein computer programs.

The controller board 2 further includes a power management controller 10, a board power control unit 11, an external power control unit 12, a physical layer (PHY) 15, a PHY clock generating unit 16, and a packet processing unit 40. The power management controller 10 controls a power supply to each of units connected to the general-purpose processor 20. The board power control unit 11 and the external power control unit 12 are connected to the power management controller 10. The PHY 15 is a network physical layer, and connects the printer 1 to the network. The PHY clock generating unit 16 generates a clock to be supplied to the PHY 15. The packet processing unit 40 is arranged between the PHY 15 and the general-purpose processor 20, and connected to both the PHY 15 and the general-purpose processor 20.

The general-purpose processor 20 is an integrated circuit (IC) such as an ASIC or an IC device. The general-purpose processor 20 serves as a main control unit and a data processing unit, for example, processes data received via the network, and processes data required for controlling an operation of each of the units included in the printer 1. The general-purpose processor 20 includes a CPU 21, a network controller 24, a clock generator 22, an SDRAM controller 23, a universal serial bus (USB) interface (I/F) 25, an HDD I/F 26, an input/output (I/O) I/F 27, a PCI I/F 28, a serial I/F 29, and an internal bus 30. The CPU 21 performs data processing and a calculation, and controls the controller board 2. The network controller 24 is used for communicating with an external network device. The SDRAM controller 23 is connected to the SDRAM 7. The USB I/F 25 is used to connect the general-purpose processor 20 to the operating unit 5. The HDD I/F 26 is used to connect the general-purpose processor 20 to the HDD 6. The I/O I/F 27 is used to control an external I/O. The PCI I/F 28 is used to connect the general-purpose processor 20 to the plotter 3. The serial I/F 29 is used to connect the general-purpose processor 20 to the packet processing unit 40. The above units included in the general-purpose processor 20 are connected to the internal bus 30 thereby enabling data transmission/reception among the units.

The SDRAM controller 23 reads out data from the SDRAM 7 and writes data on the SDRAM 7, and also controls a power mode of the SDRAM 7 to switch between a self-refresh mode and a normal power mode (a normal state). Furthermore, the SDRAM controller 23 outputs a signal indicating the power mode of the SDRAM 7, i.e., either the self-refresh mode or the normal power mode to the network controller 24.

The network controller 24 is a communication control unit for controlling the general-purpose processor 20 (the CPU 21) to be communicated with a network-connected external network device via the PHY 15. The network controller 24 includes a MAC (not shown) for controlling the communication with the external network device. The general-purpose processor 20 (the network controller 24) and the PHY 15 are connected to each other via the packet processing unit 40 by a universal bus or a universal I/F of a network PHY, such as a media independent interface (MII). The general-purpose processor 20 and the PHY 15 transmit/receive a packet (a network packet) by communicating across the network via the universal bus or the universal I/F of the network PHY. The general-purpose processor 20 transmits/receives a packet (a network packet) through the network communication via the packet processing unit 40, the PHY 15, and the universal bus or I/F. The packet processing unit 40 is further connected to the serial I/F 29, and communicates with the CPU 21 via the serial I/F 29 and the internal bus 30.

Furthermore, the general-purpose processor 20 is connected to the power management controller 10 via a universal bus 31. The power management controller 10 is controlled by the CPU 21 via the universal bus 31. The power management controller 10 controls the power supply, i.e., controls whether to supply the power or stop the power supply to each of the units included in the printer 1, including both the inside and the outside of the general-purpose processor 20, based on an input signal, i.e., any of signals D, H, and J from other units connected thereto.

The signal D input to the power management controller 10 is any of a plurality of signals output from the network controller 24, including, for example, a signal output when the network controller 24 receives a predetermined packet. The signal H is any of a plurality of signals input from the outside of the general-purpose processor 20, including, for example, a signal output when a power-mode switching key (not shown) of the printer 1 is pressed. The signal J is any of a plurality of signals output from the packet processing unit 40, including, for example, a signal output when the packet processing unit 40 receives a predetermined packet.

Based on the input signal such as the signal D, H, or J, the power management controller 10 controls the power supply to each of the units included in the printer 1, and thereby switching the power modes of the printer 1, for example, switching from the normal power mode to the power saving mode or switching from the power saving mode back to the normal power mode. Namely, it can be said that the signals D, H, and J include a signal for switching power modes of the general-purpose processor 20 and the SDRAM 7 to the normal power mode, a signal for supplying the power or stopping the power supply to each of the operating unit 5, the HDD 6, and any other unit on the controller board 2, a signal for supplying the power or stopping the power supply to the plotter 3, and the like. In the present embodiment, the printer 1 is configured to switch the power mode among three different power modes (power consumption modes) that differ in power consumption. The power modes are two different power saving modes and one normal power mode. The two power saving modes differ in the number of the units to be supplied with the power. The power management controller 10 controls the switching of the power modes. In other words, the power management controller 10 serves as a power-supply control unit that controls the switching of the three power modes of the printer 1. Incidentally, in the present embodiment, the printer 1 has the two power saving modes. However, the number of power saving modes is not limited to two. Alternatively, the printer 1 can be configured to have three or more power saving modes.

The three power modes of the printer 1 are explained below.

First, the normal power mode is explained below. In the normal power mode, all the units included in the printer 1 are supplied with the power, i.e., all areas in the printer 1 are energized. In other words, the printer 1 is in a state where normal operations can be performed. Out of the three power modes, the normal power mode requires the highest power consumption.

Next, a controller mode is explained below. The controller mode is one of the two power saving modes (a first power saving mode). In the controller mode, all the units included in the controller board 2 are supplied with the power, i.e., are energized. In other words, the power supply to the plotter 3 only is shut off.

Then, a stand-by mode is explained below. The stand-by mode is the other power saving mode (a second power saving mode). In the stand-by mode, the power supply to the plotter 3, and the operating unit 5 and the HDD 6 of the controller board 2, which are surrounded with a dashed-line frame in FIG. 1, is shut off. Furthermore, the general-purpose processor 20 is switched to the sleep mode in which the supply of clock is stopped, and the SDRAM 7 is switched to the self-refresh mode as the power saving mode. Out of the three power modes, the stand-by mode requires the lowest power consumption.

The switching of the power modes is performed by the CPU 21 via the buses 30 and 31 or by the power management controller 10 based on an input signal such as any of the signals D, H, and J. When the switching of the power modes is performed by the power management controller 10 based on an input signal, the power management controller 10 outputs predetermined signals A, B, E, F, and G to the corresponding units included in the printer 1 either directly or indirectly.

Specifically, the signal A output from the power management controller 10 is a signal for interrupting the CPU 21 so as to enable the CPU 21 and the general-purpose processor 20 or to switch the CPU 21 and the general-purpose processor 20 to the sleep mode. The signal B is a signal for switching the SDRAM 7 to the self-refresh mode or the normal power mode via the SDRAM controller 23. The signals E and F are output via the board power control unit 11. The signal E is a signal for shutting off the power supply or supplying the power to the operating unit 5 and the HDD 6. The signal F is a signal for controlling the power supply to the other units on the controller board 2, i.e., the units other than the operating unit 5 and the HDD 6 on the controller board 2. For example, the signal F is output to shut off the power supply for pull-up or to supply the power for pull-up. The signal G is output via the external power control unit 12. The signal G is a signal for controlling the power supply to the outside of the controller board 2. For example, the signal G is output to the plotter 3 so as to control the power supply to the plotter 3.

In the present embodiment, as described above, the general-purpose processor 20 including the network controller 24, the PHY 15, and the packet processing unit 40 are separately provided on the controller board 2. Furthermore, the packet processing unit 40 is arranged between the general-purpose processor 20 and the PHY 15 so as to mediate the communication between the general-purpose processor 20 and the PHY 15. Therefore, even when the printer 1 is in the power saving mode, the power is supplied to the PHY 15 and the packet processing unit 40 so that the packet processing unit 40 can process a predetermined packet. Namely, while the printer 1 is in the predetermined power saving mode, the packet processing unit 40 processes a packet received from the PHY 15. For example, when the general-purpose processor 20 and the CPU 21 are in the sleep mode, the packet processing unit 40 performs predetermined packet processing on a received packet without intervention of the general-purpose processor 20 and the CPU 21.

Figure 2:
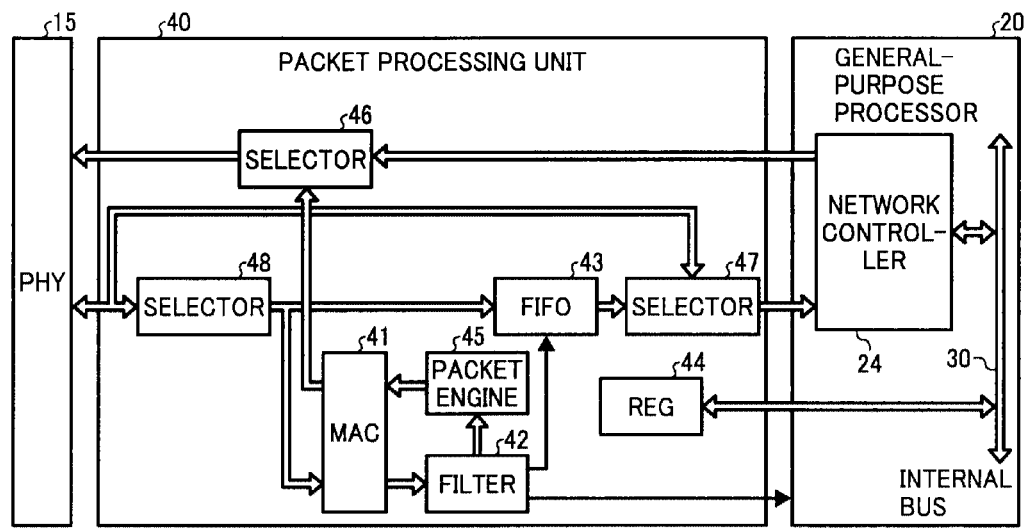
FIG. 2 is a block diagram for explaining a configuration of a packet processing unit shown in FIG. 1.

FIG. 2 is a block diagram for explaining a configuration of the packet processing unit 40.

The packet processing unit 40 includes a MAC 41, a filter 42, a first-in first-out (FIFO) 43 as a buffer memory, an internal register (REG) 44, a packet engine 45, and three selectors 46, 47, and 48. The MAC 41 is a media access controller for establishing communication with an external network device via the PHY 15. The filter 42 is used for filtering a received packet.

The selectors 46, 47, and 48 respectively switch a data path (a packet path) of a packet or the like in the packet processing unit 40. The selectors 46, 47, and 48 are used for switching a status of the packet processing unit 40 among a plurality of predetermined statuses depending on the power modes of the printer 1 or the like. Depending on the power modes of the printer 1, the selectors 46, 47, and 48 switch a packet path of a received packet in the packet processing unit 40 between an internal packet path for processing the packet within the packet processing unit 40 and a forward path for forwarding the packet to the general-purpose processor 20. In accordance with the switching of the packet path, a status of the packet processing unit 40 is also switched between a packet processing status in which the packet processing unit 40 can process a packet received via the PHY 15 and a packet forwarding status in which the packet processing unit 40 forwards a received packet to the network controller 24 without processing the packet depending on the power modes of the printer 1. Depending on the status, the packet processing unit 40 processes or forwards the packet.

Figure 3:
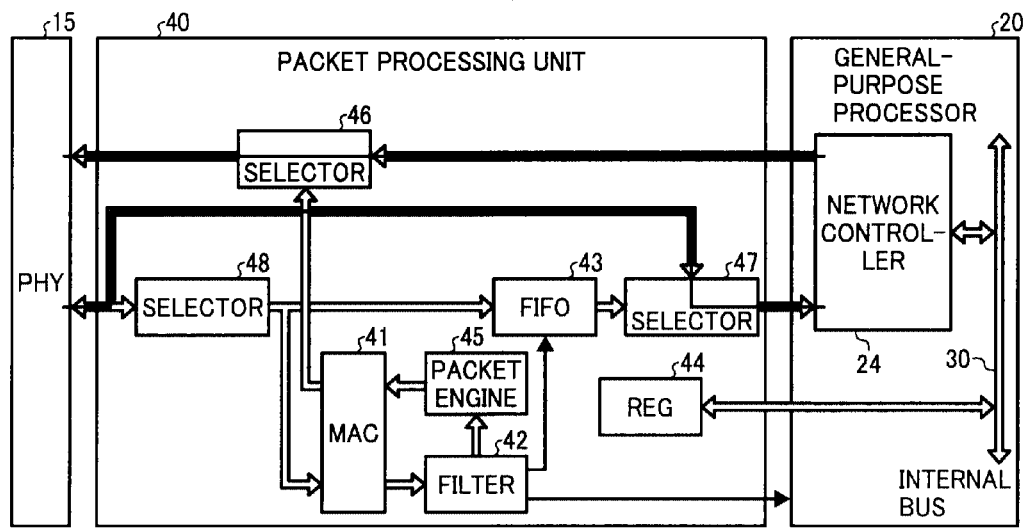
FIG. 3 is a block diagram showing a flow of a packet when the packet processing unit shown in FIG. 2 forwards the packet.

FIG. 3 is a block diagram showing a data path (a flow of a packet) when the packet processing unit 40 forwards the packet without processing the packet. The flow of the packet is indicated by a bold line in FIG. 3.

In the printer 1, when the general-purpose processor 20 (the CPU 21) is in a fit state to process a received packet, the packet processing unit 40 does not process the received packet, and forwards the packet to the network controller 24 in the general-purpose processor 20.

Specifically, when the printer 1 is in the stand-by mode, the general-purpose processor 20 is in the sleep mode, so that the packet processing unit 40 processes the packet. However, when the printer 1 is in the other power mode, i.e., any of the normal power mode and the controller mode, the general-purpose processor 20 is in the fit state to process the packet. Therefore, when the printer 1 is initialized (i.e., in an initial state) or in the power mode other than the stand-by mode, the packet processing unit 40 forwards the received packet to the general-purpose processor 20 without processing the packet. At this time, the packet processing unit 40 switches the selectors 48 and 47 so that the packet received via the PHY 15 is forwarded to the network controller 24 directly. After that, the packet processing unit 40 switches the selector 46 so that a response packet or the like from the network controller 24 is forwarded to the PHY 15 directly. Upon receiving the response packet, the PHY 15 transmits the response packet to an external network device via the network.

On the other hand, when the printer 1 is switched to the stand-by mode, the packet processing unit 40 changes the packet path by switching the selectors 46, 47, and 48 upon request from the general-purpose processor 20, and thereby switching to the packet processing status (the power saving mode) so as to process a predetermined packet. In this regard, however, only when there is no packet within the packet processing unit 40, the packet processing unit 40 can switch a packet processing function to be enabled or disabled by switching the packet path.

Figure 4:
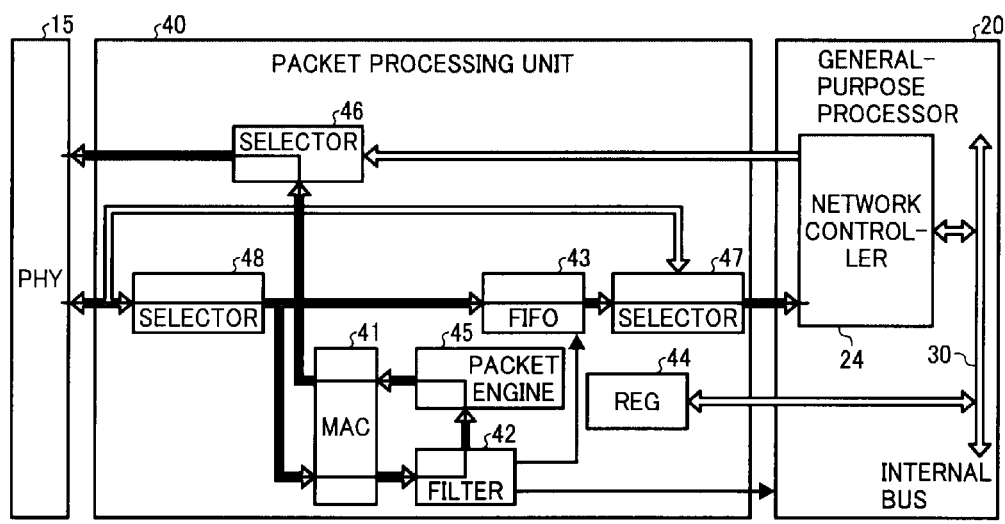
FIG. 4 is a block diagram showing a flow of a packet when the packet processing unit shown in FIG. 2 is in the packet processing status.

FIG. 4 is a block diagram showing a data path (a flow of a packet) when the packet processing unit 40 is in the packet processing status. The flow of the packet is indicated by a bold line in FIG. 4.

With the switching to the stand-by mode of the printer 1, the packet processing unit 40 changes the packet path from the forward path to the internal packet path, and switches the selector 48 so that a packet received via the PHY 15 is guided to the FIFO 43 to accumulate the packet in the FIFO 43. At the same time, the packet processing unit 40 forwards the received packet to the MAC 41. The MAC 41 converts the received packet into such a format that the filter 42 can process the packet, and forwards the converted packet to the filter 42.

The filter 42 is an address filter, i.e., determines whether to get the received packet therethrough based on an address included in the packet, such as a source MAC address and a destination MAC address. If the packet meets predetermined conditions, the filter 42, for example, discards the packet. Furthermore, the filter 42 is also a pattern filter, i.e., performs filtering on the packet based on whether the packet includes a specific pattern. Based on a pattern included in the packet, the filter 42 discards the received packet or forwards the received packet to the packet engine 45.

Namely, while the printer 1 is in the power saving mode (the stand-by mode, in this example), with the filter 42, the packet processing unit 40 determines whether the packet processing unit 40 needs to process a received packet based on a type of the packet and the like, as a first determination. When the first determination indicates that the packet processing unit 40 need not process the packet, the packet processing unit 40 discards the packet.

Specifically, the filter 42 determines a type of a packet received from the MAC 41 (for example, as any of unicast, broadcast, and multicast) based on a destination MAC address or a destination IP address included in the packet, and discards the packet if the packet need not be processed by the packet processing unit 40. Then, the filter 42 scans the packet to check whether the packet includes a specific pattern, and discards the packet if the packet need not be processed by the packet processing unit 40.

As the packet to be processed by the packet processing unit 40, for example, there are a simple network management protocol (SNMP) packet, a request packet for requesting read-out of a stored image, a print request packet, a print-data request packet, an address resolution protocol (ARP) request packet, a packet internet groper (PING) request packet, a file transfer protocol (FTP) packet, and packets for other predetermined protocols. An address allowed for passage and the specific pattern, those required for packet filtering by the filter 42, are set in the REG 44. When performing packet filtering, the filter 42 reads out the address and the specific pattern from the REG 44. Setting values of the MAC 41 and the packet engine 45 for defining operational conditions can be set by the CPU 21. In addition to the packet filtering based on the address and the specific pattern with the filter 42, the packet processing unit 40 performs a series of processes described below based on the settings values.

When a received packet is the one to be processed by the packet processing unit 40 and also is a predetermined packet that a response to which is relatively simple, such as an ARP request packet, a PING request packet, or an SNMP packet, the packet processing unit 40 forwards the packet from the filter 42 to the packet engine 45.

Upon receiving the packet, the packet engine 45 creates a response packet corresponding to a type of the received packet and the like, and forwards the created response packet to the MAC 41. Upon receiving the response packet, the MAC 41 forwards the response packet to the PHY 15 via the selector 46. The PHY 15 transmits the response packet onto the network.

In a transmission control protocol (TCP) based network communication, the TCP is not specified to respond a packet easily. Therefore, the filter 42 determines whether a received packet is a predetermined protocol packet, i.e., a packet requiring to send one response packet with respect to the one packet, such as an ARP request packet, a PING request packet, and an SNMP packet as described above. When the received packet is the predetermined protocol packet, the filter 42 detects a specific value from a field in the packet. The packet engine 45 just sends a response packet corresponding to the value detected by the filter 42. Therefore, it is possible to respond to the packet with such a simple operation.

How the filter 42 determines a received packet as an ARP request packet as one example of the predetermined protocol packet is explained in detail below. FIG. 5 is a schematic diagram for explaining a data structure of an ARP request packet.

The filter 42 detects a value of a "DESTINATION MAC ADDRESS" field and a value of a "TYPE" field from an "ETHERNET HEADER" of the ARP request packet. Then, the filter 42 detects a value of a "HARDWARE TYPE" field, a value of a "PROTOCOL TYPE" field, a value of a "HARDWARE (HW) SIZE" field, a value of a "PROTOCOL (PT) SIZE" field, a value of a "TARGET MAC ADDRESS" field, and a value of a "TARGET IP ADDRESS" field from an "ARP" of the ARP request packet.

FIG. 6 is a table for explaining conditions for creating a response packet by each of the fields included in the ARP request packet to be detected by the filter 42. The filter 42 determines whether the detected value of each of the fields meets the corresponding conditions shown in FIG. 6. When the detected value meets the corresponding conditions, the filter 42 determines that the packet needs to be processed, and the packet engine 45 creates a response packet.

In this manner, the series of processes to be performed when the packet processing unit 40 receives a packet to which the packet processing unit 40 can respond from the PHY 15 while the printer 1 is in the stand-by mode are complete.

When the filter 42 determines that the packet needs to be processed, the packet engine 45 determines whether the packet processing unit 40 can process the packet, as a second determination. When the second determination indicates that the packet processing unit 40 can process the packet, the packet engine 45 creates a response packet corresponding to a type of the packet and the like, and transmits the response packet onto the network via the PHY 15.

For example, when a received packet is a PING request packet, and the PING request packet is fragmented, if the packet processing unit 40 does not have a memory with a storage capacity corresponding to at least a size of the PING request packet before being fragmented (for example, 64 kilobytes (KB)), the packet processing unit 40 cannot process the PING request packet. Therefore, in this case, the packet engine 45 determines that the fragmented PING request packet is to be processed by the CPU 21 of the general-purpose processor 20.

How the packet engine 45 determines whether a PING request packet is fragmented is explained below. FIG. 7 is a schematic diagram for explaining a data structure of a PING request packet.

The packet engine 45 detects a value of a "DESTINATION MAC ADDRESS" field and a value of a "TYPE" field from an "ETHERNET HEADER" of the PING request packet. The packet engine 45 detects a value of a "VERSION" field, a value of a "HEADER SIZE" field, a value of a "SERVICE" field, a value of a "FLAGS" field, a value of a "FRAGMENT OFFSET" field, a value of a "PROTOCOL" field, and a value of a "DESTINATION IP ADDRESS" field from an "IP HEADER" of the PING request packet. Then, the packet engine 45 detects a value of a "TYPE" field from an "ICMP" of the PING request packet.

Figures 8, 9:
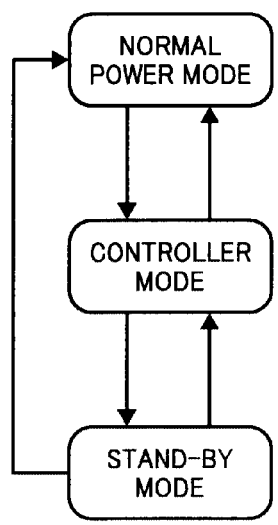
FIG. 8 is a table for explaining conditions for the PING request packet shown in FIG. 7 by each of fields included in the PING request packet to be detected by a packet engine shown in FIG. 2.
FIG. 9 is a schematic diagram for explaining switching of power modes of the printer shown in FIG. 1.

FIG. 8 is a table for explaining conditions for the PING request packet by each of the fields included in the PING request packet to be detected by the packet engine 45. When both the detected values of the "FLAGS" field and the "FRAGMENT OFFSET" field in the "IP HEADER" are not zero, the packet engine 45 determines the PING request packet as a fragmented packet.

In this manner, the packet processing unit 40 performs predetermined packet processing, including an analysis of a received packet, a discard of the received packet, and an output of a response packet with respect to the received packet.

When the packet engine 45 determines that the packet processing unit 40 cannot process a packet, the packet processing unit 40 requests to switch the general-purpose processor 20 to such a power mode that the general-purpose processor 20 can process the packet. In other words, when the received packet is a packet other than the above-described predetermined packet that a response to which is relatively simple, i.e., when the received packet is, for example, a request packet for requesting read-out of a stored image, a print request packet, an FTP packet, or a TCP packet, the packet processing unit 40 causes the filter 42 to output a device reactivation signal J (see FIG. 1) to the power management controller 10. The device reactivation signal J is a signal for requesting switching of the power mode, including switching the general-purpose processor 20, the controller board 2, and the like from the power saving mode to the normal power mode. The device reactivation signal J includes a request for switching to a different power mode depending on a type of a packet, for example, a packet requiring the operations of the plotter 3, the operating unit 5, and the HDD 6 or a packet requiring the operation of the general-purpose processor 20 only.

Therefore, it can be said that the filter 42 outputs the signal J depending on a packet received while the printer 1 is in the power saving mode to the power management controller 10, i.e., for switching the power mode of the printer 1 to the high-power consumption power mode. In other words, while the printer 1 is in a lower power consumption state than that is in a normal operation, the packet processing unit 40 outputs the signal J to switch the printer 1 from the lower power consumption state to a higher power consumption state, and thereby switching the power mode of the printer 1, for example, from the stand-by mode to the controller mode or the normal power mode. Incidentally, conditions for switching the power mode are set in the packet processing unit 40 by the general-purpose processor 20. The filter 42 determines a packet based on the set conditions, a type of the packet, and the like, and outputs the corresponding device reactivation signal J.

Then, the packet processing unit 40 forwards the packet accumulated in the FIFO 43 to the general-purpose processor 20, and writes the type of the packet as the condition for switching the power mode, information about a response to an SNMP request, or the like on the REG 44. Alternatively, the packet processing unit 40 can be configured to write the above information on the REG 44 every time the power mode of the printer 1 is switched. After that, when no packet is accumulated in the FIFO 43, and no packet is left in the packet processing unit 40, the packet processing unit 40 switches the selectors 46, 47, and 48 so that the packet path in the packet processing unit 40 is changed to the forward path for forwarding a packet to the general-purpose processor 20 (see FIG. 3).

In this manner, a series of processes to be performed by the packet processing unit 40 when the packet processing unit 40 receives a packet to be processed by the general-purpose processor 20 while the printer 1 is in the stand-by mode are complete. On the other hand, when receiving the device reactivation signal J including, for example, a controller reactivation request from the filter 42, the power management controller 10 outputs the signals A and B to switch the general-purpose processor 20 from the power saving mode (the sleep mode) back to the normal power mode, and thereby switching the power mode of the printer 1. After that, when the received packet is, for example, a management information base (MIB) request packet, the CPU 21 performs predetermined packet processing on the packet.

When the received packet is, for example, a request packet for requesting read-out of a stored image, upon receiving the device reactivation signal J including an HDD reactivation request from the filter 42, the power management controller 10 outputs the signals E and F via the board power control unit 11 in addition to the signals A and B. By the output of the signal E, the HDD 6 is supplied with the power, and the CPU 21 reads out an image stored in the HDD 6. The CPU 21 outputs image data on the read image to an external network device via the network. When the received packet is, for example, a print request packet, upon receiving the device reactivation signal J including a plotter reactivation request from the filter 42, the power management controller 10 outputs the signal G via the external power control unit 12 in addition to the signals A, B, E, and F. By the output of the signal G, the plotter 3 is supplied with the power, so that the plotter 3 is switched from the power saving mode to normal power mode. The plotter 3 prints out the image data. In this manner, depending on a received packet while the packet processing unit 40 is in the power saving mode, the power management controller 10 switches the power saving mode to the high-power consumption power mode by outputting the corresponding signal via the board power control unit 11 or the external power control unit 12, a signal path, and the like.

While the CPU 21 is in the sleep mode, when the packet processing unit 40 returns a predetermined response without intervention of the CPU 21, to perform packet processing properly after the CPU 21 is switched back to the normal power mode, it is necessary for the general-purpose processor 20 to get a content of the response returned by the packet processing unit 40 before the CPU 21 is switched back to the normal power mode. Therefore, when the printer 1 is switched from the low power consumption state to the high power consumption state, the CPU 21 accesses, for example, the REG 44 of the packet processing unit 40. Thus, before being switched back to the normal power mode, the general-purpose processor 20 acquires information on a packet processed by the packet processing unit 40, such as an identifier of an IP header included in the packet or a type of a MIB requested before a Get-Next command in an SNMP request. Such a data acquisition is performed by the CPU 21 of the general-purpose processor 20 in the present embodiment. After the power mode is switched to the high power consumption mode, the CPU 21 acquires predetermined data on the packet received before the power mode is switched from the packet processing unit 40.

Subsequently, the switching of the power modes of the printer 1 is concretely explained below.

FIG. 9 is a schematic diagram for explaining the switching of the power modes of the printer 1.

First, the switching between the normal power mode and the controller mode is explained below.

The switching from the normal power mode to the controller mode is made, for example, when the plotter 3 is not in operation for a predetermined time period, or the power-mode switching key is pressed. For example, when the CPU 21 detects that the plotter 3 is not in operation for the predetermined time period, the CPU 21 causes the power management controller 10 to shut off the power supply to the plotter 3. The power management controller 10 outputs the signal G via the external power control unit 12 thereby shutting off the power supply to the plotter 3, whereby the printer 1 is switched from the normal power mode to the controller mode.

Conversely, the switching from the controller mode to the normal power mode is made, for example, when the printer 1 receives print data or a print request from a network-connected external network device, or the power-mode switching key is pressed. For example, when the printer 1 receives print data from an external network device, the filter 42 of the packet processing unit 40 outputs the device reactivation signal J including the plotter reactivation request to the power management controller 10. Upon receiving the device reactivation signal J including the plotter reactivation request, the power management controller 10 outputs the signal G via the external power control unit 12 thereby supplying the power to the plotter 3, whereby the plotter 3 is back to the normal operation state, and the printer 1 is switched from the controller mode to the normal power mode. After that, the printer 1 forwards the print data to the SDRAM 7 via the packet processing unit 40 and the network controller 24. Then, the CPU 21 processes the print data, and forwards the processed print data to the plotter 3. The plotter 3 prints out the print data on a sheet.

Next, the switching between the controller mode and the stand-by mode is explained below.

The switching from the controller mode to the stand-by mode is made when no event occurs for a predetermined time period, for example, when the printer 1 does not receive any data to be processed by the CPU 21 via the network for the predetermined time period, and the power-mode switching key is not pressed for the predetermined time period, and also there is no input to the operating unit 5 for the predetermined time period. For example, when the CPU 21 confirms that no event occurs for the predetermined time period, the CPU 21 causes the power management controller 10 to switch the CPU 21 to the sleep mode; the SDRAM 7 to the self-refresh mode; and a part of the controller board 2 and a part of the general-purpose processor 20 to the power saving mode. The power management controller 10 outputs the signals A and B and the signals E and F via the board power control unit 11 thereby switching the CPU 21 to the sleep mode; the SDRAM 7 to the self-refresh mode; and the part of the controller board 2 and the part of the general-purpose processor 20 to the power saving mode, whereby the printer 1 is switched from the controller mode to the stand-by mode.

Conversely, the switching from the stand-by mode to the controller mode is made, for example, when the printer 1 receives a request packet for requesting read-out of image data stored in the HDD 6 from an external network device. When the printer 1 receives the request packet, the filter 42 of the packet processing unit 40 outputs the device reactivation signal J not including the plotter reactivation request to the power management controller 10. Upon receiving the device reactivation signal J not including the plotter reactivation request, the power management controller 10 outputs the signal A thereby switching the CPU 21 from the sleep mode to the normal power mode, and outputs the signal B thereby switching the SDRAM 7 from the self-refresh mode to the normal power mode. Furthermore, the power management controller 10 outputs the signals E and F via the board power control unit 11 thereby switching a part of the controller board 2, such as the HDD 6, and a part of the general-purpose processor 20 from the power saving mode to the normal power mode. As a result, the printer 1 is switched from the stand-by mode to the controller mode. In this state, the printer 1 forwards the request packet to the SDRAM 7 via the packet processing unit 40 and the network controller 24. Then, the CPU 21 reads out the requested image data from the HDD 6, and transmits the image data to the external network device connected via the network.

At last, the switching from the stand-by mode to the normal power mode is explained below.

The switching from the stand-by mode to the normal power mode is made, for example, when the printer 1 receives print data or a print request from an external network device, or the power-mode switching key is pressed. For example, when the printer 1 receives print data from an external network device, the filter 42 of the packet processing unit 40 outputs the device reactivation signal J including the plotter reactivation request to the power management controller 10. Upon receiving the device reactivation signal J including the plotter reactivation request, the power management controller 10 outputs the signal A thereby switching the CPU 21 from the sleep mode to the normal power mode, and outputs the signal B thereby switching the SDRAM 7 from the self-refresh mode to the normal power mode. Furthermore, the power management controller 10 outputs the signals E and F via the board power control unit 11 thereby switching a part of the controller board 2 and a part of the general-purpose processor 20 from the power saving mode to the normal power mode. Moreover, the power management controller 10 outputs the signal G via the external power control unit 12 thereby supplying the power to the plotter 3 to return the plotter 3 back to the normal operation state, whereby the printer 1 is switched from the stand-by mode to the normal power mode. After that, the printer 1 forwards the print data to the SDRAM 7 via the packet processing unit 40 and the network controller 24. Then, the CPU 21 processes the print data, and forwards the processed print data to the plotter 3. The plotter 3 prints out the print data on a sheet.

Figure 10:
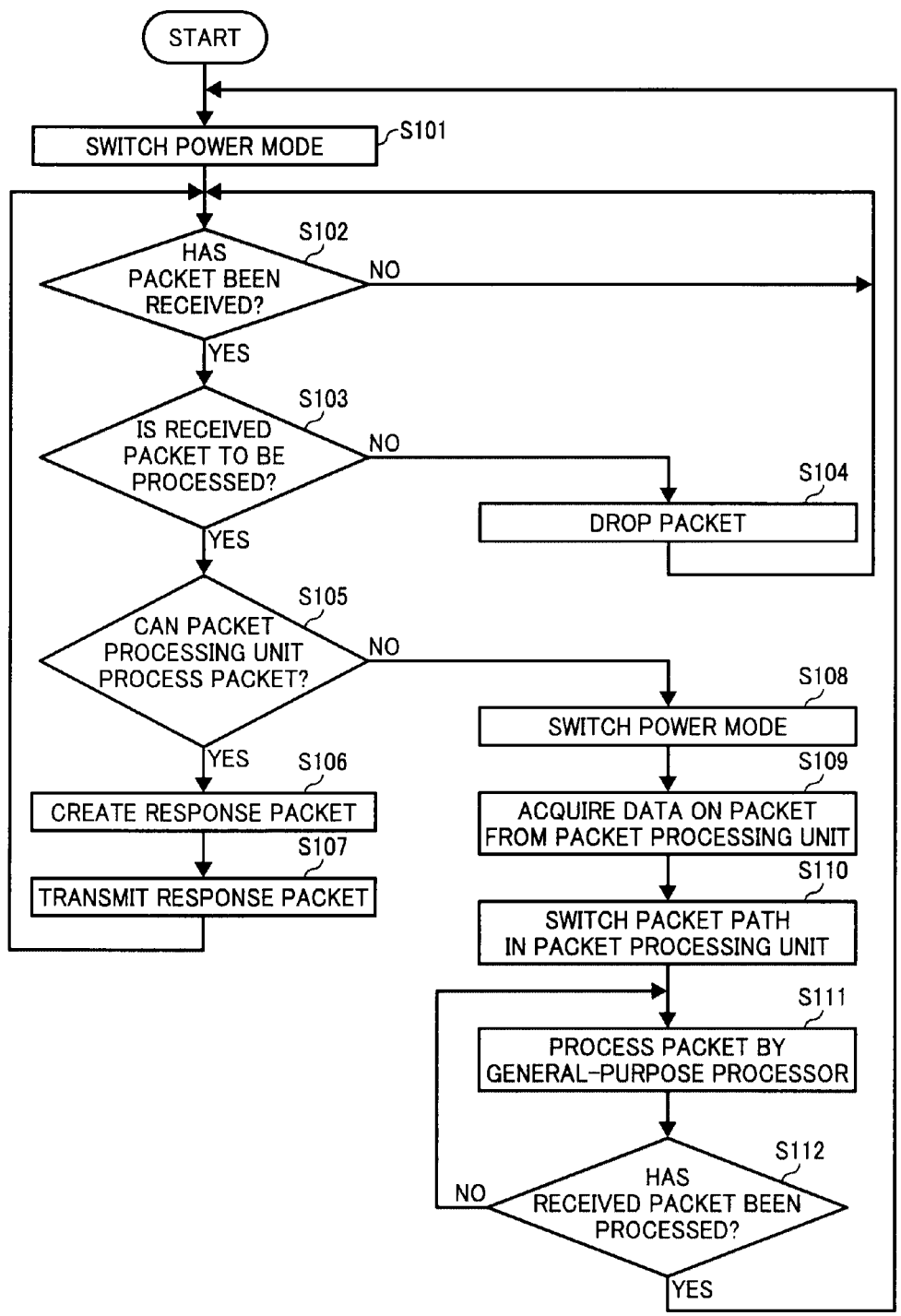
FIG. 10 is a flowchart of packet processing performed by the printer shown in FIG. 1.

Subsequently, information processing performed by the printer 1, including packet processing on a received packet performed by the packet processing unit 40 or the like, with switching the printer 1 between the normal power mode and the power saving mode is explained below. FIG. 10 is a flowchart of the packet processing performed by the printer 1.

The printer 1 processes a packet received via the PHY 15 by performing either first packet processing or second packet processing depending on the power mode of the printer 1. Specifically, while the printer 1 is in the normal power mode or the first power saving mode (i.e., the controller mode), the general-purpose processor 20 performs the first packet processing. While the printer 1 is in the second power saving mode (i.e., the stand-by mode), the packet processing unit 40 performs the second packet processing. Depending on the conditions as explained above with reference to FIG. 9, the power mode of the printer 1 is switched from the normal power mode or the controller mode to the stand-by mode (Step S101).

It is determined whether the printer 1 receives a packet via the network and the PHY 15 (Step S102). When the printer 1 does not receive any packet (NO at Step S102), the printer 1 stands by in the stand-by mode until the printer 1 receives a packet. When the printer 1 receives a packet while in the stand-by mode (YES at Step S102), the packet processing unit 40 (the filter 42) determines whether the received packet needs to be processed (Step S103). Specifically, the packet processing unit 40 performs packet filtering with the filter 42 based on, for example, an address included in the received packet. When the received packet is determined not to be processed (NO at Step S103), the packet processing unit 40 discards the received packet (Step S104). The process control returns to Step S102, and the printer 1 stands by for a next packet.

On the other hand, when the received packet is determined to be processed (YES at Step S103), the packet processing unit 40 (the filter 42) further determines whether the packet processing unit 40 can process the received packet (Step S105). When it is determined that the packet processing unit 40 can process the received packet (YES at Step S105), the packet processing unit 40 performs the second packet processing on the received packet while the printer 1 is in the stand-by mode, i.e., without switching the printer 1 to the normal power mode or the controller mode. Specifically, the packet engine 45 of the packet processing unit 40 creates a response packet to the received packet (Step S106). The packet processing unit 40 transmits the response packet onto the network via the PHY 15 (Step S107). The process control returns to Step S102, and the printer 1 stands by for a next packet in the stand-by mode.

On the other hand, when it is determined that the packet processing unit 40 cannot process the received packet (NO at Step S105), the printer 1 is switched from the stand-by mode to the normal power mode or the controller mode so that the general-purpose processor 20 can perform the first packet processing on the received packet (Step S108). Specifically, the packet processing unit 40 outputs the signal J to the power management controller 10, and thereby switching the printer 1 from the stand-by mode to the controller mode or the normal power mode. After the printer 1 is switched to the controller mode or the normal power mode, the general-purpose processor 20 acquires data on the received packet and another packet that the packet processing unit 40 receives before the power mode of the printer 1 is switched from the packet processing unit 40 (Step S109).

The printer 1 is configured to switch a packet path for processing the received packet in the packet processing unit 40 between the internal packet path (see FIG. 4) and the forward path (see FIG. 3). In this case, the printer 1 switches the packet path to the forward path (Step S110). Incidentally, such a switching of the packet path is performed when there is no packet within the packet processing unit 40. The general-purpose processor 20 performs a corresponding process on the packet depending on a type and a request content of the received packet, for example, the general-purpose processor 20 forwards or prints out image data (Step S111). When the packet processing by the general-purpose processor 20 is complete (YES at Step S112), the process control returns to Step S101, and the power mode of the printer 1 is switched to the stand-by mode when the predetermined conditions are met.

Figure 11:
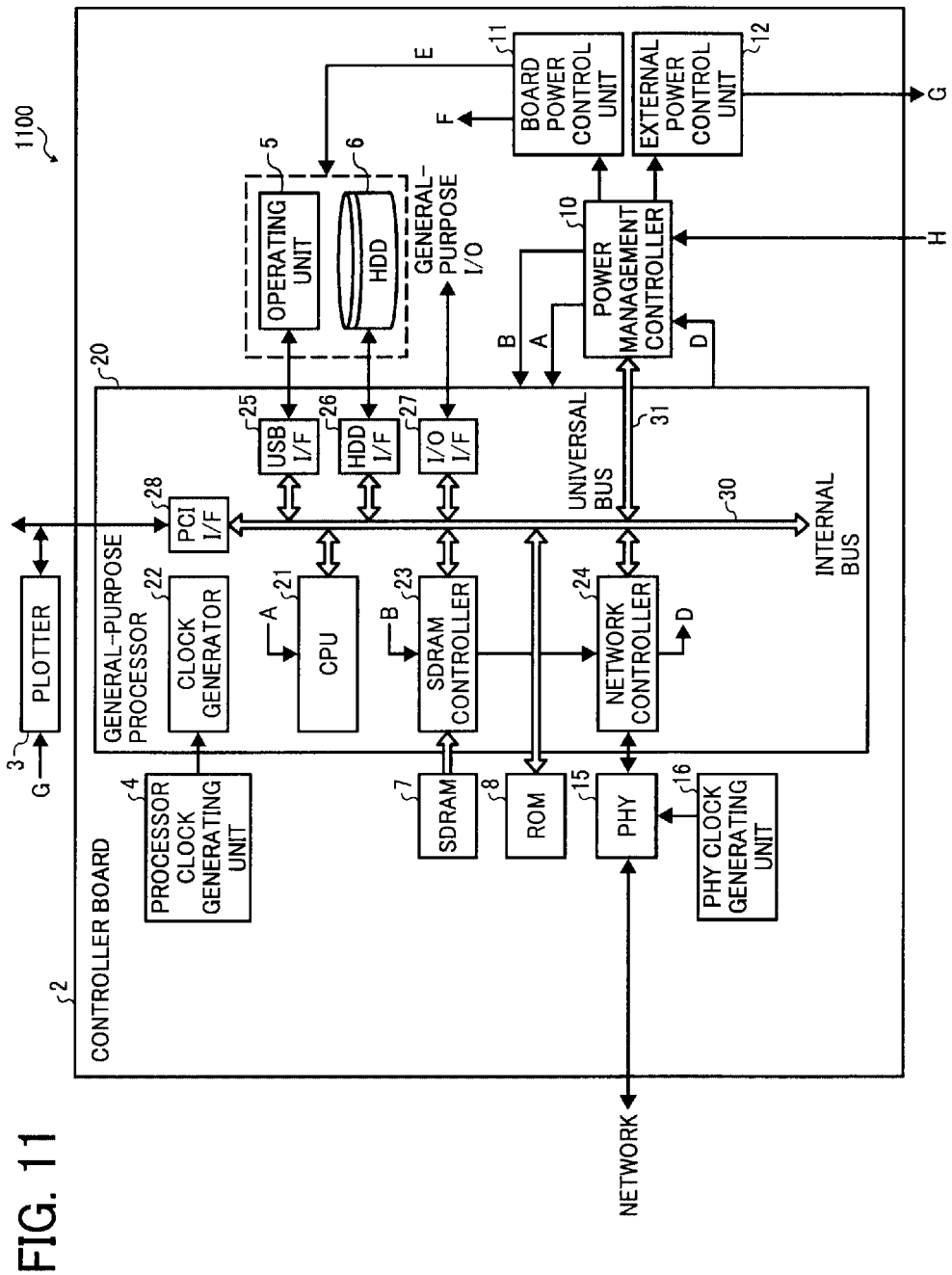
FIG. 11 is a block diagram of a conventional printer.

Unlike a printer 1100 shown in FIG. 11 as an example of a conventional printer not including the packet processing unit 40, in the printer 1 according to the present embodiment, as shown in FIG. 1, the PHY 15 and the general-purpose processor 20 (the network controller 24) are connected to each other via the packet processing unit 40. Therefore, the general-purpose processor 20 receives a packet transmitted from the network via the packet processing unit 40. At this time, when the printer 1 is in the predetermined power saving mode, the packet processing unit 40 determines whether the received packet needs to be processed or can be processed by the packet processing unit 40. Depending on the determination, the packet processing unit 40 performs predetermined packet processing, for example, discards the received packet, or outputs a response packet to the received packet without intervention of the CPU 21. Therefore, it is not necessary to switch the CPU 21 or the like back to the normal power mode every time the printer 1 receives a packet. Consequently, even when the printer 1 receives a packet while in the power saving mode, the switching from the power saving mode to the normal power mode may not be necessary for some of the units included in the printer 1, such as the general-purpose processor 20 including the CPU 21, i.e., some of the units included in the printer 1 can be kept in the power saving mode for a longer time.

In this manner, the printer 1 can receive a packet even while in the power saving mode, so that a duration of the low power-consumption state can be kept longer than that of the conventional printer. As a result, it is possible to reduce power consumption of the printer 1. Furthermore, the network controller 24, the packet processing unit 40, and the PHY 15 are connected by, for example, a general-purpose PHY interface. Therefore, even when the printer 1 employs a general-purpose processor including a MAC and the like, such a packet processing function enabling to keep the power saving state long can be easily added to the printer 1.

Furthermore, in such an apparatus employing various types of processors to support various types of performances of the system (or the apparatus), the packet processing function can be added thereto by simply installing the packet processing unit 40. Therefore, it is possible to reduce a development cost for the processors including an ASIC and the like. Consequently, it is possible to improve the effect of the power saving mode of each of the units and also to achieve the decrease in power consumption at low cost regardless of a model of the apparatus, whereby it is possible to reduce the overall cost. In addition, a general-purpose interface is applicable to this case, so that the packet processing unit 40 can be applied to various types of processors regardless of whether each of the processors is the general-purpose one or not. Therefore, it is possible to reduce the total cost. By the use of the packet processing unit 40, the packet processing function can be easily added to a conventional apparatus by a small change in software or the like because there is no change in the operation in the normal power mode with or without the packet processing function.

Moreover, for example, when a dedicated network controller for processing a received packet is connected to an external bus of the CPU such as a PCI bus, the network processing function of the general-purpose processor 20 is not utilized uselessly. However, in the printer 1, such a function can be utilized effectively because the sophisticated network processing function of the general-purpose processor 20 can be completely utilized after the general-purpose processor 20 is switched from the power saving state to the normal state. Furthermore, in the printer 1, it is not necessary to provide a function irrelevant to network communications, such as the PCI bus function, to the printer 1 additionally. It is enough to provide only the function relevant to the network communication and the packet processing function relevant to the decrease in power consumption to the packet processing unit 40. Therefore, a configuration of the printer 1 can be prevented from being complicated relatively, and thus it is possible to reduce a cost of the printer 1.

Namely, the printer 1 according to the present embodiment can process a predetermined packet received via the network even while in the power saving mode, so that it is possible to reduce power consumption with preventing an increase in cost.

While the printer 1 is in the predetermined power saving mode, the packet processing unit 40 determines whether the packet processing unit 40 can process a received packet, and outputs a signal for switching the power mode of the printer 1 to the high-power consumption power mode. For example, when the packet processing unit 40 determines that a received packet needs to be processed by the general-purpose processor 20 while the general-purpose processor 20 is in the sleep mode, the packet processing unit 40 requests the switching of the power mode by outputting a signal for switching the general-purpose processor 20 from the sleep mode to the normal power mode. Therefore, even in an apparatus including a processor that does not have a function of switching the power modes of the CPU or the like, for example, from the power saving mode to the normal power mode, by providing the packet processing unit 40 to the apparatus, the power mode of the apparatus can be switched to the power saving mode while the apparatus is in a fit state to receive a packet. Therefore, power consumption of the apparatus can be reduced effectively.

Furthermore, depending on the power mode of the printer 1, the packet processing unit 40 can switch a packet path of a packet in the packet processing unit 40. Therefore, when the general-purpose processor 20 is in not the sleep mode but the normal power mode, i.e., in a fit state to process a received packet, the packet processing unit 40 forwards the received packet to the general-purpose processor 20 without processing the packet. As a result, it is possible to save a latency (a delay time) taken to get the packet to the general-purpose processor 20 while in the normal power mode, and also to improve data throughput when the packet processing unit 40 transfers data to the general-purpose processor 20 while checking reception of a packet continuously.

Moreover, the switching of the packet path is performed when there is no packet within the packet processing unit 40.

Therefore, in such a simple way, it is possible to prevent from occurring that the forwarding order of a plurality of received packets is mixed up or data of a plurality of received packets is mixed. Furthermore, the units included in the packet processing unit 40 perform an analysis of a received packet, a discard of the received packet, a creation and an output of a response packet with respect to the received packet, and the like. Therefore, it is possible to keep the printer 1 or the processor in the power saving mode for a longer time, so that power consumption of the printer 1 or the processor can be reduced lower.

In addition, after the power mode is switched to the high-power consumption power mode because of reception of a packet, the general-purpose processor 20 accesses the packet processing unit 40 to acquire predetermined data on the packet received before the power mode is switched from the packet processing unit 40. Therefore, the general-purpose processor 20 can grasp, for example, a content of the packet processing performed by the packet processing unit 40 without intervention of the CPU 21, so that the CPU 21 can perform packet processing properly. Consequently, problems caused by an inhibition of the packet processing can be reliably prevented from occurring.

Incidentally, in the present embodiment, the filter 42 of the packet processing unit 40 performs packet filtering while the general-purpose processor 20 is in a state where the general-purpose processor 20 cannot process a received packet (i.e., in the stand-by mode). Alternatively, the packet filtering can be performed while the general-purpose processor 20 is in other states. In this case, the packet filtering is performed in such a manner that a filter similar to the filter 42 is provided on a forward path for forwarding a packet received by the packet processing unit 40 to the general-purpose processor 20 without passing though the filter 42 (see FIG. 3). Or, a new selector or the like can be additionally provided to the packet processing unit 40, so that the packet processing unit 40 can forward the received packet to the general-purpose processor 20 via the filter 42 by switching the selectors.

When the printer 1 is in a state where the general-purpose processor 20 can process a received packet (i.e., in the normal power mode or the controller mode), the address filter of the filter 42 is activated, and the filter 42 performs packet filtering based on an address included in the received packet. As a result, a data-processing efficiency of the printer 1 can be improved. For example, a destination MAC address and a sender MAC address are included in a header of an Ethernet frame, so that it is easy to perform the filtering based on MAC addresses included in the received packet. Therefore, a latency when the packet processing unit 40 forwards the received packet to the general-purpose processor 20 after the filter 42 performs the address filtering can be shortened as compared with a case where the filter 42 scans the entire packet.

Therefore, when the filter 42 includes the address filter, regardless of the power mode of the printer 1 (i.e., regardless of whether the printer 1 is in the power saving mode or the normal power mode), it is preferable that the filter 42 performs packet filtering based on an address included in a received packet by activating the address filter. Thus, the filter 42 can discard an unnecessary packet that need not be processed by the general-purpose processor 20 with saving a latency taken to forward a received packet to the general-purpose processor 20. As a result, a load on the CPU 21 of the general-purpose processor 20 or the like can be reduced, so that it is possible to improve the data-processing efficiency of the printer 1.

Furthermore, unlike the present embodiment, when the network controller 24 of the general-purpose processor 20 has a function of switching the power modes of the CPU 21 upon reception of a signal indicating a predetermined packet or the like, it is not necessary to connect between the packet processing unit 40 and the power management controller 10 by a signal path for the device reactivation signal J. In this case, a predetermined signal indicating a packet that the packet processing unit 40 cannot process is output to the network controller 24. Upon receiving the signal, the network controller 24 switches the power mode of the CPU 21 or other units.

In the first embodiment, the packet processing unit 40 is connected to the serial I/F 29 of the general-purpose processor 20. Alternatively, the packet processing unit 40 can be connected to the general-purpose processor 20 by other connecting unit.

Figure 12:
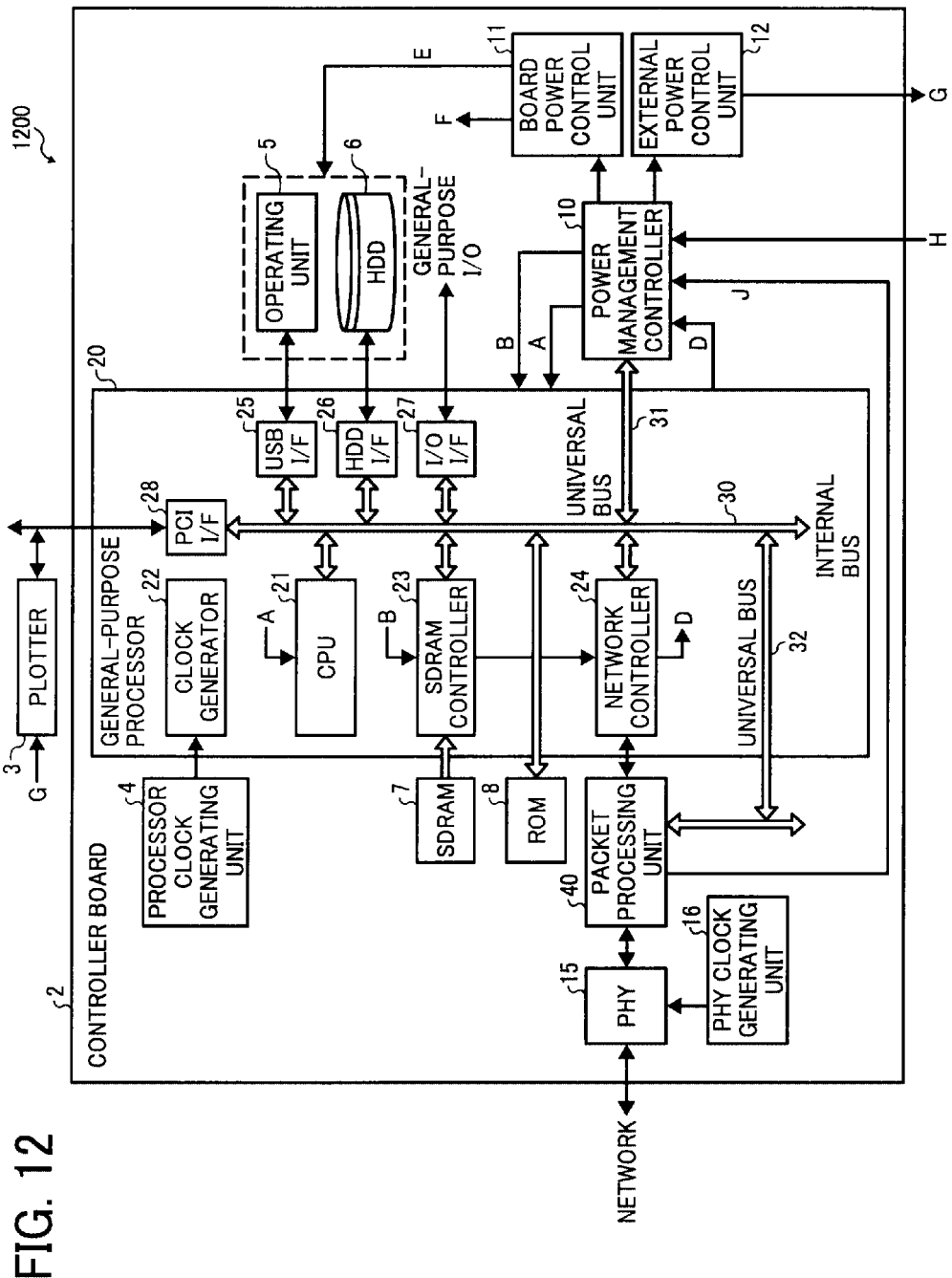
FIG. 12 is a block diagram of a printer according to a second embodiment of the present invention.

FIG. 12 is a block diagram of a printer 1200 according to a second embodiment of the present invention. The portions identical to those in FIG. 1 for the first embodiment are denoted with the same reference numerals, and the description of those portions is omitted.

In the printer 1200, the packet processing unit 40 is connected to the internal bus 30 of the general-purpose processor 20 via a universal bus 32 so as to communicate with the CPU 21 via the universal bus 32 and the internal bus 30. In this manner, the packet processing unit 40 can be configured to communicate with the CPU 21 via the buses without involving the serial I/F 29.

In the first and second embodiments, when it is determined that the packet processing unit 40 can process a packet, the packet engine 45 creates a response packet. In a third embodiment of the present invention, even when it is determined that the packet processing unit 40 can process a packet, it is further determined whether the packet is to be processed by the packet processing unit 40.

Figure 13:
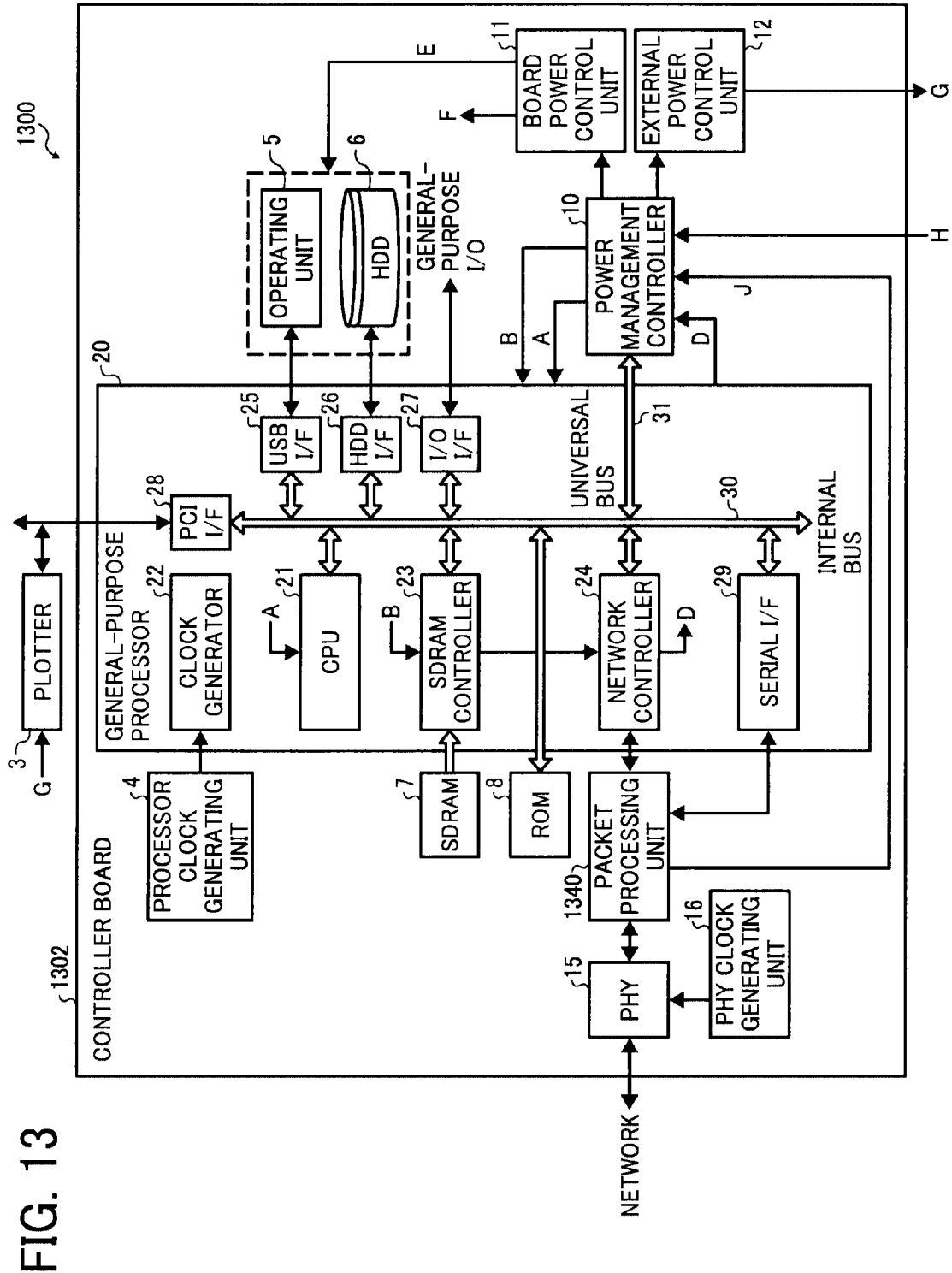
FIG. 13 is a block diagram of a printer according to a third embodiment of the present invention.

FIG. 13 is a block diagram of a printer 1300 according to the third embodiment of the present invention. The portions identical to those in FIG. 1 for the first embodiment are denoted with the same reference numerals, and the description of those portions is omitted. A difference between the printers 1 and 1300 is that the printer 1300 includes a controller board 1302 instead of the controller board 2. A difference between the controller boards 2 and 1302 is that the controller board 1302 includes a packet processing unit 1340 instead of the packet processing unit 40.

The packet processing unit 1340 determines whether the packet processing unit 1340 can process a packet in the same manner as the packet processing unit 40. When it is determined that the packet processing unit 1340 can process the packet, the packet processing unit 1340 further determines whether the packet is to be processed by the packet processing unit 1340. When it is determined that the packet is to be processed by the packet processing unit 1340, the packet engine 45 creates a response packet. On the other hand, when it is determined that the packet is not to be processed by the packet processing unit 1340, the packet processing unit 1340 forwards the packet to the general-purpose processor 20, and instructs to switch the power mode of the general-purpose processor 20 to the normal power mode.

Even though the packet processing unit 1340 can process a packet, the packet processing unit 1340 does not process the packet, for example, when the packet engine 45 includes a CPU with a lower processing capability than the CPU 21 of the general-purpose processor 20. The CPU of the packet engine 45 performs a process relevant to packet processing, such as a creation of a response packet, by executing a computer program stored in a ROM included in the packet processing unit 1340. Furthermore, for example, when a received packet is encrypted, and the encrypted packet is to be decrypted, the packet processing unit 1340 can decrypt the packet by causing the CPU of the packet engine 45 to execute a decryption program. However, in this case, a processing speed is not fast.

The CPU 21 of the general-purpose processor 20 has a higher processing capability than the CPU of the packet engine 45, so that the general-purpose processor 20 can decrypt the packet with a cryptography engine included in the CPU 21 at high speed. Therefore, the packet processing unit 1340 determines that the packet processing unit 1340 does decrypt the packet, and forwards the encrypted packet to the general-purpose processor 20.

Incidentally, in the present embodiment, when the packet processing unit 1340 determines not to process a packet, the packet processing unit 1340 forwards the packet to the general-purpose processor 20, and the general-purpose processor 20 creates a response packet. Alternatively, when the packet processing unit 1340 determines not to process a packet, for example, it can be configured not to create or transmit a response packet.

For example, there is a case where it is not necessary to return a response packet with respect to a packet received from a sender with a specific IP address. Therefore, the packet processing unit 1340 can be configured to create a response packet with respect to only a predetermined packet, such as a PING request packet, an ARP request packet, and the like, and also configured to neither create a response packet with respect to a packet received from the sender with the specific IP address nor forward the packet to the general-purpose processor 20.

Figure 14:
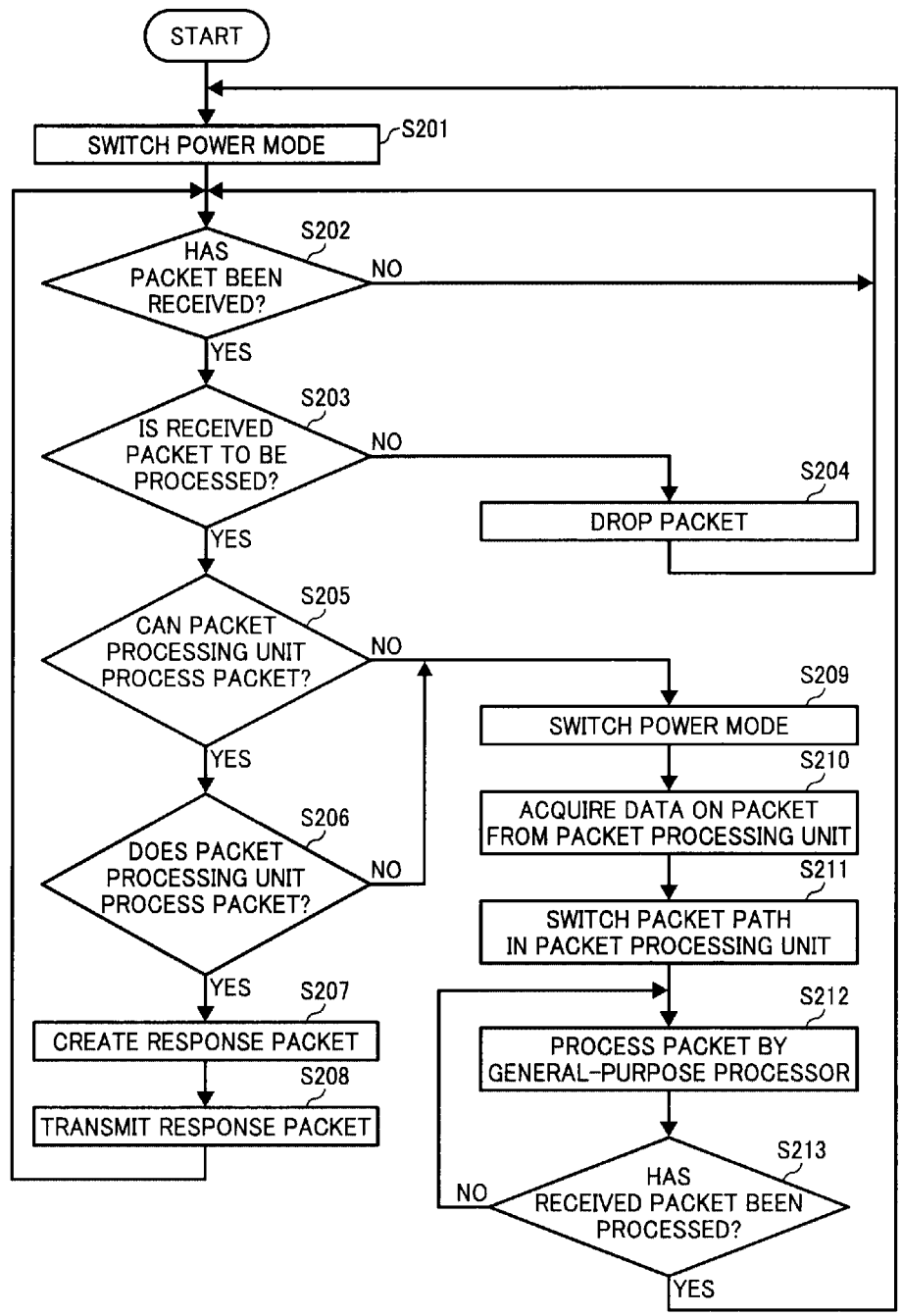
FIG. 14 is a flowchart of packet processing performed by the printer shown in FIG. 13.

Subsequently, packet processing performed by the printer 1300 is explained below. FIG. 14 is a flowchart of the packet processing performed by the printer 1300.

Procedures at Steps S201 to S205 are identical to those at Steps S101 to S105 in FIG. 10, and the description of those Steps is omitted. When it is determined that the packet processing unit 1340 can process a packet (YES at Step S205), the packet processing unit 1340 further determines whether to process the packet (Step S206).

When the packet processing unit 1340 determines to process the packet (YES at Step S206), the packet engine 45 creates a response packet with respect to the received packet (Step S207). The packet processing unit 1340 transmits the response packet onto the network via the PHY 15 (Step S208). The process control returns to Step S202, and the printer 1300 stands by for a next packet in the stand-by mode.

On the other hand, when the packet processing unit 1340 determines not to process the packet (NO at Step S206), the printer 1300 is switched from the stand-by mode to the normal power mode or the controller mode so that the general-purpose processor 20 can perform the first packet processing on the received packet (Step S209). Procedures at Steps S210 to S213 are identical to those at Steps S109 to S112 in FIG. 10, and the description of those Steps is omitted.

In this manner, in the present embodiment, even when the packet processing unit 1340 determines that the packet processing unit 1340 can process a packet, the packet processing unit 1340 further determines whether to process the packet. Therefore, packet processing can be performed more efficiently. Especially, if the packet processing unit 1340 is composed of software, the packet processing unit 1340 determines not to process a packet requiring a high processing capability, and causes the general-purpose processor 20 having the high processing capability to process the packet. Therefore, the packet processing can be performed at high speed.

In the above embodiments, the packet processing unit 40 or 1340 is installed on the printer as an example of the information-processing apparatus according to the present invention. The packet processing units 40 and 1340 can serve as a network processing device. The network processing device is provided between the PHY 15 and the general-purpose processor 20 (the network controller 24) so as to mediate the communication between the general-purpose processor 20 and the PHY 15 and process a packet received via the network. In this case, the network processing device is configured to include such a packet processing unit that determines whether the packet processing unit needs to process a packet received via the PHY as the first determination and further determines whether the packet processing unit can process the packet as the second determination while the information-processing apparatus is in the power saving mode. The PHY and the processor are connected to each other via the network processing device. Therefore, it is possible to control the switching of the power modes, i.e., it is possible to obtain the same effects as described in the above embodiments.

The packet processing unit 40 or 1340 and other elements included in the printer according to any of the first to third embodiments can be composed of any of hardware and software.

Namely, a method for packet processing performed by any of the printers 1, 1200, and 1300 as examples of the information-processing apparatus according to the present invention can be written in a general program language into a computer program enabling a computer to execute the packet processing. Furthermore, the computer program can be stored in any computer-readable recording medium, such as a flexible disk (FD), a compact disk read-only memory (CD-ROM), a digital versatile disk read-only memory (DVD-ROM), or magneto-optical disk (MO), so that a computer can read the computer program from the recording medium.

According to one aspect of the present invention, the information-processing apparatus capable of switching between the power saving mode and the normal power mode can process a predetermined packet received via the network even while in the power saving mode, whereby it is possible to reduce cost because of low power consumption.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information-processing apparatus comprising:
a connecting unit that connects to a network;
a processor including a communication control unit that communicates with an external network device via the connecting unit;
a power control unit that switches a power mode between a first power mode in which a power is supplied to all elements and a second power mode in which a power supply is limited to selected elements; and
a packet processing unit that is connected between the connecting unit and the processor, wherein
the packet processing unit includes
a first determining unit that performs a packet filtering based on an address included in a packet received through the connecting unit, and determines whether a packet processing is needed for a packet received through the connecting unit when the power mode is set to the second power mode, and a second determining unit that determines, when the first determining unit determines that the packet processing is needed for the packet, whether the packet processing is available in the packet processing unit, and the power control unit switches the power mode based on a result of determination by the second determining unit.

2. The information-processing apparatus according to claim 1, wherein the second power mode includes a plurality of sub power modes having a different number of selected elements, with respect to a packet received when the power mode is set to a first sub power mode, the power control unit switches from the first sub power mode to a second sub power mode having higher power consumption than the first sub power mode.

3. The information-processing apparatus according to claim 1, wherein when the first determining unit determines that the packet processing is not needed for the packet, the packet processing unit discards the packet.

4. The information-processing apparatus according to claim 1, wherein the packet processing unit further includes a packet-path switching unit that switches a packet processing path between a first path for processing the packet in the packet processing unit and a second path for forwarding the packet to the processor based on the power mode.

5. The information-processing apparatus according to claim 2, wherein when the second determining unit determines that the packet processing is not available, the packet processing unit forwards the packet to the processor, and the power control unit switches the power mode to a sub power mode in which the power is supplied to the processor.

6. The information-processing apparatus according to claim 2, wherein when the power mode is switched to the second sub power mode, the processor obtains data of a packet received before switching the power mode.

7. The information-processing apparatus according to claim 2, wherein upon determining that the packet processing is available, the second determining unit further determines whether to process the packet in the packet processing unit, and when the second determining unit determines not to process the packet, the packet processing unit forwards the packet to the processor, the power control unit switches the power mode to a sub power mode in which the power is supplied to the processor.

8. The information-processing apparatus according to claim 5, wherein when the second determining unit determines that the packet processing is available, the packet processing unit creates a response packet to the packet, and transmits the response packet to the network via the connecting unit.

9. The information-processing apparatus according to claim 4, wherein the packet-path switching unit switches the packet processing path when there is no packet in the packet processing unit.

10. The information-processing apparatus according to claim 7, wherein when the second determining unit determines to process the packet, the packet processing unit creates a response packet to the packet, and transmits the response packet to the network via the connecting unit.

11. A method of processing a packet in an information processing apparatus that includes a connecting unit for connecting to a network, a processor including a communication control unit for communicating with an external network device via the connecting unit, and a packet processing unit that is connected between the connecting unit and the processor, the method comprising:

switching a power mode between a first power mode in which a power is supplied to all elements and a second power mode in which a power supply is limited to selected elements;

first determining including packet filtering based on an address included in a packet received through the connecting unit, and determining whether a packet processing is needed for a packet received through the connecting unit when the power mode is set to the second power mode; and second determining including determining, when it is determined that the packet processing is needed for the packet at the first determining, whether the packet processing is available, wherein the switching includes switching the power mode based on a result of determination at the second determining.

12. A computer program product comprising a non-transitory computer readable storage medium having computer-readable program codes embodied in the medium for processing a packet in an information processing apparatus that includes a connecting unit for connecting to a network, a processor including a communication control unit for communicating with an external network device via the connecting unit, and a packet processing unit that is connected between the connecting unit and the processor, the program codes when executed causing the information processing apparatus to execute:

switching a power mode between a first power mode in which a power is supplied to all elements and a second power mode in which a power supply is limited to selected elements;

first determining including packet filtering based on an address included in a packet received through the connecting unit, and determining whether a packet processing is needed for a packet received through the connecting unit when the power mode is set to the second power mode; and second determining including determining, when it is determined that the packet processing is needed for the packet at the first determining, whether the packet processing is available, wherein the switching includes switching the power mode based on a result of determination at the second determining.

* * * * *